United States Patent [19]

Thompson, III et al.

[11] Patent Number: 4,473,407

[45] Date of Patent: Sep. 25, 1984

[54] RHEOLOGICAL CONTROL OF POLYESTER-STYRENE RESIN COMPOSITIONS BY ADDITION OF AN ORGANOCLAY AND PREPARATION THEREOF

[75] Inventors: Thomas D. Thompson, III, Upper Black Eddy, Pa.; Frank J. Botta, Linden; Thomas F. Walsh, Florham Park, both of N.J.

[73] Assignee: Georgia Kaolin Company, Inc., Union, N.J.

[21] Appl. No.: 501,957

[22] Filed: Jun. 7, 1983

[51] Int. Cl.$^3$ ............................................. C09C 1/00
[52] U.S. Cl. ................................ 106/308 N; 523/508
[58] Field of Search .................... 106/308 N; 523/508

[56] References Cited

U.S. PATENT DOCUMENTS

| | | | |
|---|---|---|---|
| 2,531,396 | 11/1950 | Carter et al. | 106/308 N |
| 3,014,001 | 12/1961 | Murray | 523/508 |
| 3,029,209 | 4/1962 | Ferrigno | 106/308 N |
| 3,078,249 | 2/1963 | Russell | 106/308 N |
| 3,833,467 | 9/1974 | Spiller | 106/308 N |
| 3,974,125 | 8/1976 | Oswald et al. | 523/521 |
| 4,081,496 | 3/1978 | Finlayson | 523/508 |
| 4,215,031 | 7/1980 | Payne | 523/508 |
| 4,216,135 | 8/1980 | Finlayson | 523/508 |
| 4,365,030 | 12/1982 | Oswald et al. | 523/508 |
| 4,412,018 | 10/1983 | Finlayson et al. | 523/508 |

*Primary Examiner*—Lewis T. Jacobs
*Attorney, Agent, or Firm*—William W. Habelt

[57] ABSTRACT

An organoclay functional as a rheological modifier for control of the viscosity and thixotropy of polyester-styrene compositions is prepared by a dry process wherein a quaternary ammonium salt is reacted with unfractionated smectite in an aqueous dispersion thereby eliminating the fractionating step required in the typical prior art wet process as exemplified by U.S. Pat. No. 4,240,951 and permitting the preparation of the organoclay rheological modifier to be carried out at a high solids content thereby reducing drying costs in the recovery of the product organoclay.

7 Claims, 5 Drawing Figures

RHEOLOGICAL CONTROL OF POLYESTER-STYRENE RESIN COMPOSITIONS BY ADDITION OF AN ORGANOCLAY AND PREPARATION THEREOF

BACKGROUND OF THE INVENTION

The present invention relates to the control of rheological properties of polyester-styrene resin compositions and, more particularly, the control of the rheological properties of polyester-styrene resin compositions by the addition of an organoclay thereto and a method for the preparation of such an organoclay.

Polyester-styrene compositions have found wide spread use, particularly as lay-up resins and gel coats, in the fabrication of a wide variety of products. In particular, polyester-styrene compositions are widely used in the fabrication of fiberglass articles such as boats, automobile body parts and accessories. As polyester-styrene compositions exhibit low viscosity and no thixotropy, it is necessary that a suitable rheological modifier be mixed with the polyester-styrene composition in order to increase viscosity and provide a thixotropic composition functional as a lay-up resin or gel.

It is well-known that organically modified smectites may be added to polyester-styrene composition as rheological modifiers, either in the form of a pregel with styrene or by direct addition, to improve viscosity and provide thixotropy. Smectites are clay minerals, including montmorillonite, saponite, beidellite, and hectorite, which are characterized by their swelling properties and high cation-exchange capacities. Bentonite, a rock term in which the main mineral is smectite, is formed as a result of the alteration of volcanic ash. Smectites, and bentonites, whose exchangeable cations are mainly sodium, are respectively known to those skilled in the art as sodium smectite and sodium bentonite, and those whose exchangeable cations are mainly calcium and/or magnesium are respectively known to those skilled in the art as alkaline earth smectites and alkaline earth bentonite. The cation exchange capacities of pure smectites generally range between 75 milliequivalents per 100 grams clay to 110 milliequivalents per 100 grams clay.

One method of preparing organoclays suitable as rheological modifiers for polyester-styrene compositions is disclosed in U.S. Pat. No. 4,240,951. According to this "wet" processing method, quaternary ammonium salts are reacted with a water fractionated smectite to produce quaternary ammonium montmorillonites which are suitable as rheological modifiers for polyester-styrene resins. The quaternary ammonium salts disclosed in U.S. Pat. No. 4,240,951 for treating the water fractionated smectite are dimethyldialkylammonium halide, dimethyldialkylammonium methyl sulfate, dimethylbenzylalkylammonium halide and dimethylbenzylalkylammonium methyl sulfate, wherein the alkyl group contains at least ten carbon atoms.

In the method disclosed in U.S. Pat. No. 4,240,951, the smectite to be treated is first mixed with water to form a low-solids slurry. The slurry is then fractionated, i.e. screened and then centrifuged, to yield a low-solids slurry consisting essentially of montmorillonite particles less than one micron equivalent spherical diameter. It is only this water fractionated montmorillonite portion of the smectite slurry which is reacted with the quaternary ammonium salt to produce the desired organoclay. Additionally, as the product organoclay is produced in a low-sollids slurry form, the product slurry must be filtered and the filter cake dried, typically for 40 hours at 60 C. in a blower oven, to recover the product organoclay.

It is an object of the present invention to provide a "dry" processed organoclay suitable as a rheological modifier for polyester-styrene compositions.

It is a further object of the present invention to provide a "dry" process for producing organoclay rheological modifiers wherein the step of fractionating the crude smectite prior to treatment is avoided and the whole smectite, not just the montmorillonite portion thereof, is utilized.

It is a still further object of the present invention to provide a process for producing organoclays wherein the drying required to recover the product organoclay is minimized.

SUMMARY OF THE INVENTION

An organoclay functional as a rheological modifier for polyester-styrene compositions is produced by treating a high solids content dispersion of unfractionated bentonite with a quaternary ammonium halide treatment agent, a significant portion of which comprises a quaternary ammonium halide having behenyl alkyl groups, preferably dimethyl benzyl behenyl ammonium chloride.

In the preferred embodiment of the process of the present invention, the treatment of the unfractionated bentonite dispersion is carried out in two steps. First, dimethyl benzyl hydrogenated tallow ammonium chloride is added to the bentonite dispersion. Then, after a period of stirring to allow the first step treatment to proceed, dimethyl benzyl behenyl ammonium chloride is added to the bentonite dispersion and allowed to react therewith. Preferably, the treatment of the bentonite dispersion is carried out at a treatment level of about 60 milliequivalents per 100 grams of clay and at a treatment ratio of 60% dimethyl benzyl behenyl ammonium chloride and 40% dimethyl benzyl hydrogenated tallow ammonium chloride.

DESCRIPTION OF THE PREFERRED EMBODIMENTS

Figure 1:
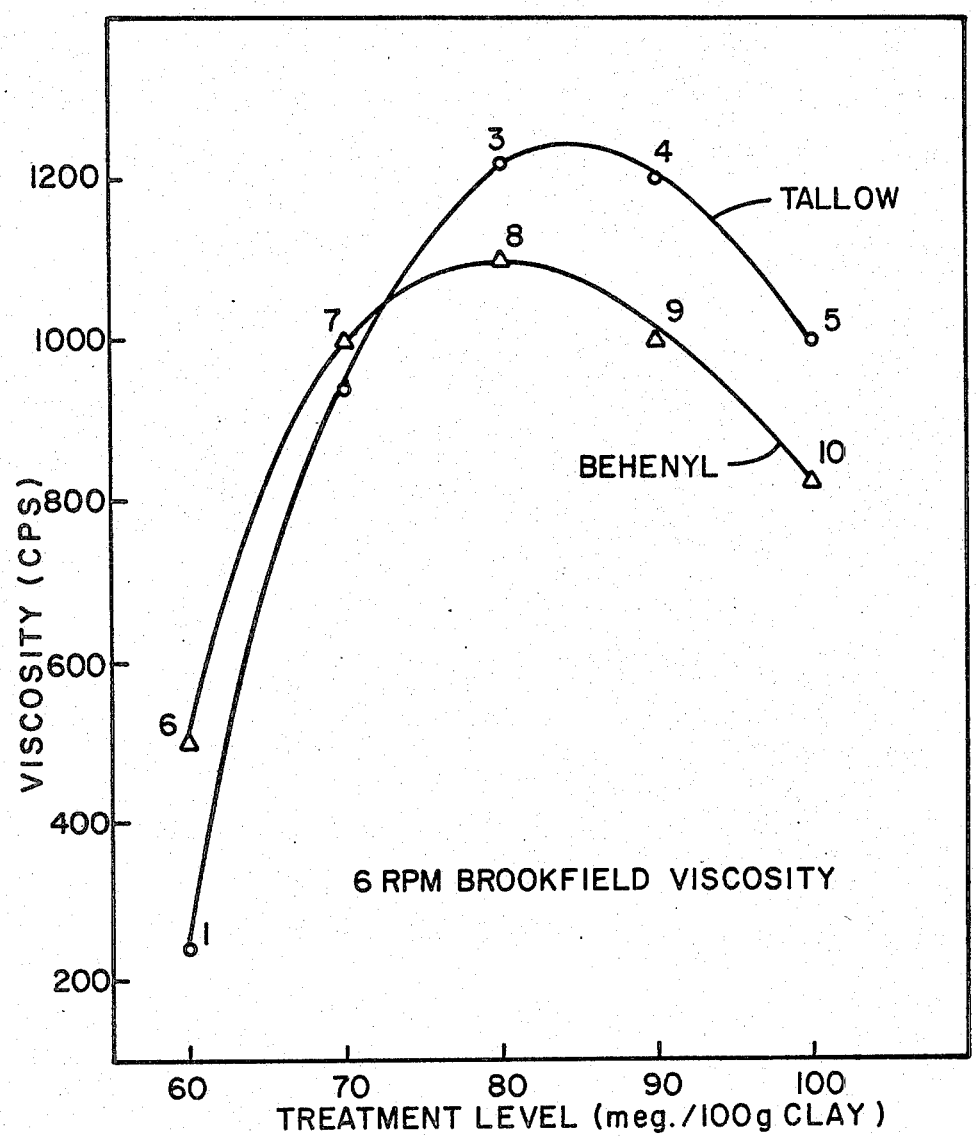
FIG. 1 is a graphical illustration of the variation in viscosity with treatment level for the organoclay-polyester-styrene compositions derived from the wet processed organoclays of Examples 1 through 10 produced in accordance with the wet process of the U.S. Pat. No. 4,240,951.

A better understanding of the practice and the effectiveness of the present invention may be gained from the discussion presented hereinafter with reference to the following examples in which:

Examples 1 through 5 describe the preparation of an organoclay in accordance with the prior art wet process exemplified by U.S. Pat. No. 4,240,951 by treating a water fractionated smectite with dimethyl benzyl hydrogenated tallow ammonium chloride at various treatment levels ranging from 60 to 100 milliequivalents per 100 grams of clay;

Examples 6 through 10 describe the preparation of an organoclay in accordance with the prior art wet process exemplified by U.S. Pat. No. 4,240,951 by treating a water fractionated smectite with dimethyl benzyl behenyl ammonium chloride at various treatment levels ranging from 60 to 100 milliequivalents per 100 grams of clay;

Examples 11 through 15 describe the preparation of an organoclay by treating a 60% solids smectite dispersion with dimethyl benzyl behenyl ammonium chloride at various treatment levels ranging from 50 to 100 milliequivalents per 100 grams of clay;

Examples 16 through 18 describe the preparation of an organoclay by treating a 60% solids smectite dispersion with dimethyl benzyl hydrogenated tallow ammonium chloride at various treatment levels ranging from 70 to 90 milliequivalents per 100 grams of clay;

Examples 19 through 21 describe the preparation of an organoclay by treating a 60% solids smectite dispersion with dimethyl benzyl hydrogenated talow ammonium chloride and dimethyl benzyl behenyl ammonium chloride, at a ratio of 1 part dimethyl benzyl hydrogenated tallow ammonium chloride to 3 parts dimethyl benzyl behenyl ammonium chloride, at various treatment levels ranging from 80 to 110 milliequivalents per 100 grams of clay; and Examples 22 through 26 describe the preparation of an organoclay by treating a 60% solids smectite dispersion with dimethyl henzyl hydrogenated tallow ammonium chloride and/or dimethyl benzyl behenyl ammonium chloride at a treatment level of 80 millieqquivalents per 100 grams of clay over a range of blend ratios.

The effectiveness of each of the organoclays prepared according to the examples presented herein was evaluated by adding each organoclay to a polyester-styrene resin and measuring the viscosity of the resulting composition. To incorporate an organoclay into a polyester-styrene resin, a styrene-organoclay pre-gel was first formed by dispersing 18 grams of the organoclay into 108 grams under high shear mixing using a Cowles blade to give a pre-gel having a solids content of 14.3%. After mixing for approximately five minutes, the styrene-organoclay pre-gel is ready to be added to the polyester-styrene resin. Each resulting organoclay-polyester-styrene composition was then mixed for one-half hour using a Cowles blade and deaerating prior to measuring the viscosity of the resultant composition at 25° C. as a means of evaluating the performance of the various organoclays as rheological modifiers.

In measuring the viscosity, the resultant compositions were placed in a water bath at 25° C. for one hour to bring the composition to the reference temperature of 25° C. A Brookfield LVT viscometer was used to measure the viscosity, first at 60 rpm and then at 6 rpm. The viscometer spindle was allowed to rotate for two minutes at each rpm setting prior to taking a viscosity reading. The thixotropic area index was also calculated in some samples of dividing the viscosity reading at 6 rpm by the viscosity reading at 60 rpm.

Two general purpose polyester resins were used in evaluating the rheological properties of the organoclays: Polyester Resin 44-360 and Polyester Resin 44-368, both products of the Reichhold Chemical Company. The organoclay-polyester-styrene compositions were formed by adding 10.5 grams of pre-gel to 150 grams of a 60% polyester-40% styrene resin to yield a composition with an organoclay solids content of 0.93% by weight and a polyester to styrene ratio of 57% to 43%. To increase the organoclay solids content to 1.4%, 15.7 grams of pre-gel are added to 150 grams of a 60% polyester-40% styrene resin, whereby the polyester to styrene ratios changes to 56% to 44%.

EXAMPLE 1

A 6.25% slurry of bentonite mined in the Kaycee area of Johnson County, Wyo., was screened, then fractionated via a laboratory centrifuge to produce a 4.55% solids slurry consisting essentially of montmorillonite particles less than 1 micron equivalent spherical diameter (esd). Approximately 1.5 liters of the clay slurry (containing 70 grams of dry clay) was heated to 50° C. in a large beaker with stirring. Then 24.1 g. Bioquat 816 (75% active dimethyl benzyl hydrogenated tallow ammonium chloride and 25% isopropanol), a product of BioLabs, Inc., was heated with 50 ml. of isopropanol to approximately 60° C., and then added to the clay slurry. After 30 minutes of stirring, the slurry was filtered. The resultant filter cake was dried for 18 hours at 70° C. in a forced air over, and then pulverized in a micropulverizer to less than 325 mesh.

The cation enchange treatment level was 60 milleguivalents per 100 grams of clay.

EXAMPLE 2

The procedure described in Example 1 was followed except 28.1 g. of Bioquat 816, heated with 50 ml. of isopropanol, was added to the clay slurry. The cation exchange treatment level was thereby increased to 70 millequivalents per 100 grams of clay.

EXAMPLE 3

The procedure described in Example 1 was followed except 32.2 g. of Bioquat 816, heated with 50 ml. of isopropanol, was added to the clay slurry. The cation exchange treatment level was thereby increased to 80 millequivalents per 100 grams of clay.

EXAMPLE 4

The procedure described in Example 1 was followed except 36.2 g. of Bioquat 816, heated with 50 ml. of isopropanol, was added to the clay slurry. The cation exchange treatment level was thereby increased to 90 milliequivalents per 100 grams of clay.

EXAMPLE 5

The procedure described in Example 1 was followed except 40.2 of Bioquat 816, heated with 50 ml. of isopropanol, was added to the clay slurry. The cation exchange treatment level was thereby increased to 100 milliequivalents per 100 grams of clay.

EXAMPLE 6

A 6.25% slurry of bentonite mined in the Kaycee area of Johnson County, Wyo., was screened, then fractionated via a laboratory centrifuge to produce a 4.55% solids slurry consisting essentially of montmorillonite particles less than 1 micron equivalent spherical diameter (esd). Approximately 1.5 liters of the clay slurry (containing 70 grams of dry clay) was heated to 50° C. in a large beaker with stirring. Then 33.1 g. Bioquat 822 (60% active dimethyl benzyl behenyl ammonium chloride and 40% isopropanol), a product of BioLabs, Inc., was heated with 50 ml. of isopropanol to approximately 60° C., and then added to the clay slurry. After 30 minutes of stirring, the slurry was filtered. The resultant filter cake was dried for 18 hours at 70° C. in a forced air oven, and then pulverized in a micropulverizer to less than 325 mesh.

EXAMPLE 7

The procedure described in Example 6 was followed except 38.4 g. of Bioquat 822, heated with 50 ml. of isopropanol, was added to the clay slurry. The cation exchange treatment level was thereby increased to 70 milliequivalents per 100 grams of clay.

EXAMPLE 8

The procedure described in Example 6 was followed except 44.0 g. of Bioquat 822, heated with 50 ml. of isopropanol, was added to the clay slurry. The cation exchange treatment level was thereby increased to 80 milliequivalents per 100 grams of clay.

EXAMPLE 9

The procedure described in Example 6 was followed except 49.4 g. of Bioquat 822, heated with 50 ml. of isopropanol, was added to the clay slurry. The cation exchange treatment level was thereby increased to 90 milliequivalents per 100 grams of clay.

EXAMPLE 10

The procedure described in Example 6 was followed except 58.4 g. of Bioquat 822, heated with 50 ml. of isopropanol, was added to the clay slurry. The cation exchange treatment level was thereby increased to 100 milliequivalents per 100 grams of clay.

A comparison of the viscosities of the resultant organoclay-polyester-styrene compositions produced using the wet-processed organoclays prepared as outlined in Examples 1 through 10 is presented in FIG. 1. As illustrated therein, the organoclays of Examples 1 through 5 prepared by the wet process of U.S. Pat. No. 4,240,951 using dimethyl benzyl hydrogenated tallow ammonium chloride (Bioquat 816) and the organoclays of Examples 6 through 10 prepared by the wet process of U.S. Pat. No. 4,240,951 using dimethyl benzyl behenyl ammonium chloride (Bioquat 822) performed approximately the same as rheological modifiers with the organoclays of the hydrogenated tallow derivative performing slightly better than the organoclays of the behenyl derivative at treatment levels above approximately 75 milliequivalents per 100 grams of clay.

Each of the viscosity readings shown in FIG. 1 was taken at 6 rpm in accordance with the measurement procedure outlined hereinbefore. The organoclay-polyester-styrene composition upon which the viscosity readings were obtained was prepared in accordance with the pre-gel preparation and addition procedures outlined hereinbefore with the pre-gels of each of the organoclays of Examples 1 through 10 being added to a polyester-styrene mixture derived from Polyester Resin 44-360 to form an organoclay-polyester-styrene composition having an organoclay solids content of 0.93%.

EXAMPLE 11

A 60% solids dispersion of smetite was prepared adding 147 milliliters of water to 353 grams of air dried (to 15% moisture) bentonite mined in the Kaycee area of Johnson County, Wyo., while mixing on a Hobart mixer at moderate shear for 10 minutes. Then 117.5 grams of a 60% solids dispersion of Bioquat 822 was added to and mixed with the bentonite dispersion. After thirty minutes of stirring, the resultant friable mixture was dried for 3 hours at 70° C. in a forced air oven and then pulverized.

The cation exchange treatment level was 50 milliequivalents per 100 grams of clay.

EXAMPLE 12

The procedure described in Example 11 was followed except that 141 grams of Bioquat 822 was added to the bentonite dispersion. The cation exchange level was thereby increased to 60 milliequivalents per 100 grams of clay.

EXAMPLE 13

The procedure described in Example 11 was followed except that 164.5 grams of Bioquat 822 was added to the bentonite dispersion. The cation exchange level was thereby increased to 70 milliequivalents per 100 grams of clay.

EXAMPLE 14

The procedure described in Example 11 was followed except that 199.8 grams of Bioquat 822 was added to the bentonite dispersion. The cation exchange level was thereby increased to 85 milliequivalents per 100 grams of clay.

EXAMPLE 15

The procedure described in Example 11 was followed except that 235 grams of Bioquat 822 was added to the bentonite dispersion. The cation exchange level was thereby increased to 100 milliequivalents per 100 grams of clay.

EXAMPLE 16

A 60% solids dispersion of smectite was prepared adding 147 milliliters of water to 353 grams of air dried (to 15% moisture) bentonite mined in the Kaycee area of Johnson County, Wyo., while mixing on a Hobart mixer at moderate shear for 10 minutes. Then 150.8 grams of a 60% solids dispersion of Bioquat 816 was added to and mixed with the bentonite dispersion. After thirty minutes of stirring, the resultant friable mixture was dried for 3 hours at 70° C. in a forced air oven and then pulverized.

The cation exchange treatment level was 70 milliequivalents per 100 grams of clay.

EXAMPLE 17

The procedure described in Example 16 was followed except that 172.4 grams of Bioquat 816 was added to the bentonite dispersion. The cation exchange level was thereby increased to 80 milliequivalents per 100 grams of clay.

EXAMPLE 18

The procedure described in Example 16 was followed except that 194 grams of Bioquat 816 was added to the bentonite dispersion. The cation exchange level was thereby increased to 90 milliequivalents per 100 grams of clay.

EXAMPLE 19

A 60% solids dispersion of smectite was prepared adding 147 milliliters of water to 353 grams of air dried (to 15% moisture) bentonite mined in the Kaycee area of Johnson County, Wyo., while mixing on a Hobart mixer at moderate shear for 10 minutes. Then 43.1 grams of a 60% solids dispersion of Bioquat 816 was added to and mixed with the bentonite dispersion. After ten minutes of stirring, 141 grams of a 60% solids dispersion of Bioquat 822 was added to and mixed with the bentonite/Bioquat 816 mixture. After an additional twenty minutes of stirring, the resultant friable mixture was dried for 3 hours at 70° C. in a forced air oven, and then pulverized.

The cation exchange treatment level was 80 milliequivalents per 100 grams of clay, with the treatment ratio being 75% Bioquat 822 and 25% Bioquat 816.

EXAMPLE 20

The procedure described in Example 19 was followed except that 53.8 grams of a 60% solids dispersion of o Bioquat 816 and 176.6 grams of a 60% solids dispersion of Bioquat 822 were used to treat the bentonite dispersion. The cation exchange treatment level was thereby increased to 100 milliequivalents per 100 grams of clay with the treatment ratio remaining 75% Bioquat 822 and 25% Bioquat 816.

EXAMPLE 21

The procedure described in Example 19 was followed except that 59.3 grams of a 60% solids dispersion of o Bioquat 816 and 193.9 grams of a 60% solids dispersion of Bioquat 822 were used to treat the bentonite dispersion. The cation exchange treatment level was thereby increased to 110 milliequivalents per 100 grams of clay with the treatment ratio remaining 75% Bioquat 822 and 25% Bioquat 816.

Figure 2:
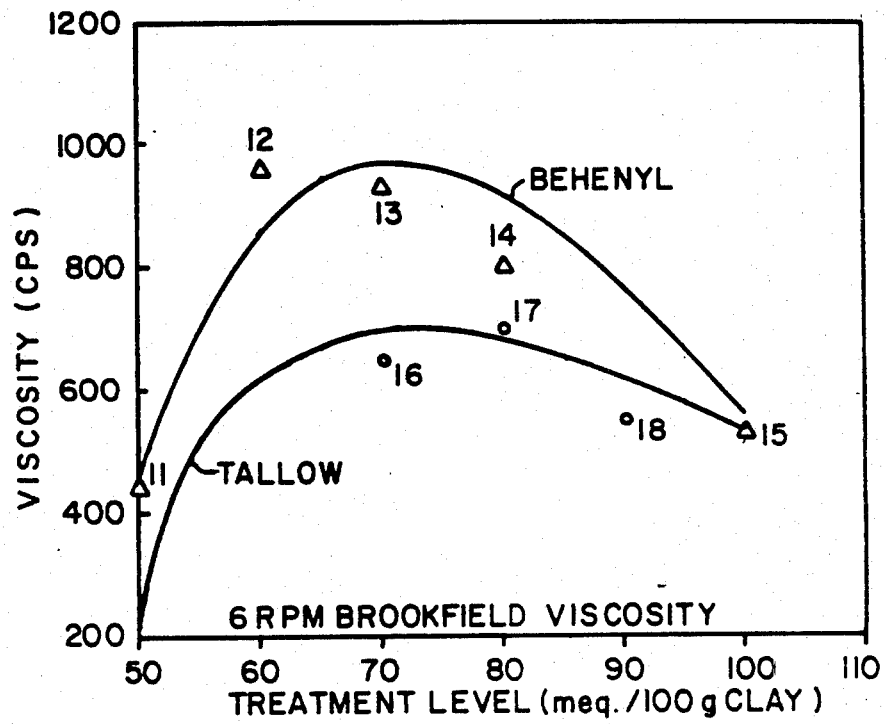
FIG. 2 is a graphical illustration of the variation in viscosity with treatment level for the organoclay-polyester-styrene compositions derived from the dry-processed organoclays of Examples 11 through 18.

A comparison of the viscosities of the resultant organoclay-polyester-styrene compositions produced by mixing pre-gels derived from each of the dry-processed organoclays as outlined in Examples 11 through 18 with a polyester-styrene derived from Polyester Resin 44-368 in accordance with the pre-gel preparation and addition procedures outlined hereinbefore to produce organoclay-polyester-styrene composition having an organoclay solids content of 1.4% is presented in FIG. 2. Each of the viscosity readings shown in FIG. 2 was taken at 6 rpm in accordance with the measurement procedure outlined hereinbefore.

As illustrated in FIG. 2, the organoclays of Examples 11 through 15 prepared by the dry process of the present invention using dimethyl benzyl behenyl ammonium chloride (Bioquat 822) consistently performed better as rheological modifiers than the organoclays of Examples 16 through 18 prepared by the dry process of the present invention using dimethyl benzyl hydrogenated tallow ammonium chloride (Bioquat 816). Optimum enhancement of the rheological properties of the organoclay-polyester-styrene composition derived from the behenyl organoclay occurred at a cation exchange treatment level of approximately 70 milliequivalents per 100 grams of clay.

Figure 3:
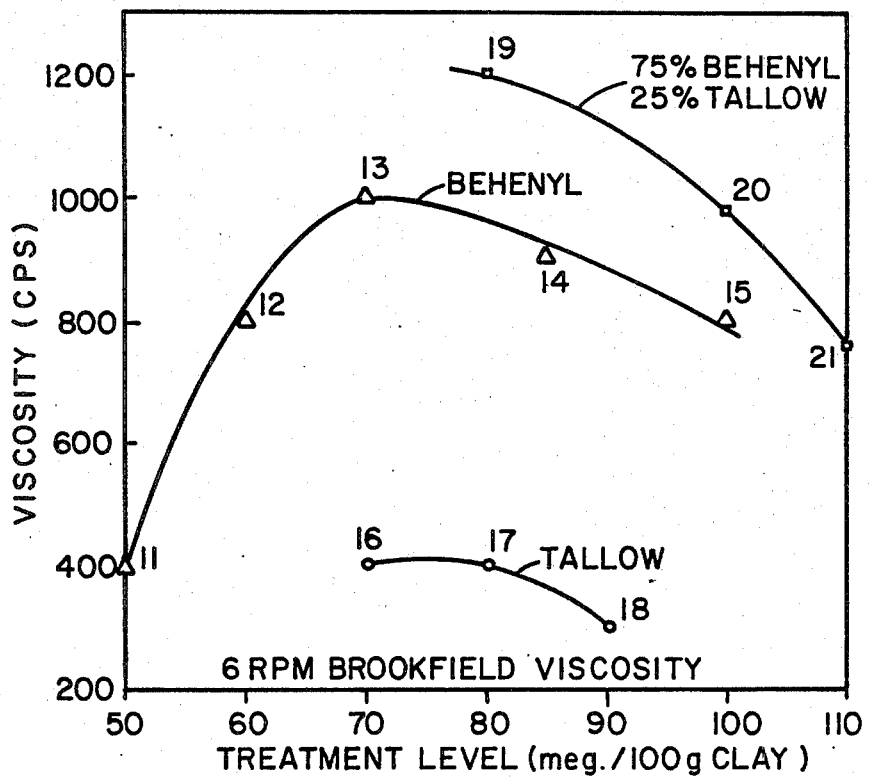
FIG. 3 is a graphical illustration of the variation in viscosity with treatment level for the organoclay-polyester-styrene compositions derived from the dry-processed organoclays of Examples 11 through 21.

A comparison of the viscosities of the resultant organoclay-polyester-styrene compositions produced by mixing pre-gels derived from each of the dry-processed organoclays as outlined in Examples 11 through 21 with a polyester-styrene derived from Polyester Resin 44-360 in accordance with the pre-gel preparation and addition procedures outlined hereinbefore to produce an organoclay-polyester-styrene composition having an organoclay solids content of 0.93% is presented in FIG. 3. Each of the viscosity readings shown in FIG. 3 was taken at 6 rpm in accordance with the measurement procedure outlined hereinbefore.

As illustrated in FIG. 3, the organoclays of Examples 11 through 15 prepared by the dry process of the present invention using dimethyl benzyl behenyl ammonium chloride (Bioquat 822) consistently performed significantly better as rheological modifiers than the organoclays of Examples 16 through 18 prepared by the dry process of the present invention using dimethyl benzyl hydrogenated tallow ammonium chloride (Bioquat 816). Optimum enhancement of the rheological properties of the resultant organoclay-polyester-styrene composition occurred at a cation exchange treatment level of approximately 70 milliequivalents per 100 grams of clay.

Additionally, the organoclays of Examples 19 through 21 prepared by the dry process of the present invention by treating the bentonite dispersion with both dimethyl benzyl hydrogenated tallow ammonium chloride and dimethyl benzyl behenyl ammonium chloride (at a treatment ratio of 25% Bioquat 816 and 75% Bioquat 822) consistently performed better as rheological modifiers than the organoclays of Examples 11 through 18 prepared by the dry process of the present invention by treating the bentonite dispersion with only the behneyl ammonium chloride (Examples 11-15) or with only the hydrogenated tallow ammonium chloride (Examples 16-18).

A comparison of the viscosity curves shown in FIG. 3 for organoclay-polyester-styrene compositions derived from Polyester Resin 44-360 treated with organoclays prepared in accordance with the dry process of the present invention with the viscosity curves shown in FIG. 1 for organoclay-polyester compositions also derived from Polyester Resin 44-360 but treated with organoclays prepared in accordance with the prior art wet process as exemplified by U.S. Pat. No. 4,240,951, clearly shows that the dry process of the present invention will yield organoclays which will function as rheological modifiers in polyester-styrene compositions to an extent similar to the wet processed organoclays of the prior art provided that the alkyl chain length of the quaternary ammonium compound used to treat the clay is properly selected. By increasing the alkyl chain length of the quaternary ammonium compound for hydrogenated tallow having carbon chains containing 16 to 18 carbons to predominantly behenyl having carbon chains containing 22 carbons, the viscosity of the resultant organoclay-polyester-styrene complex more than doubles when the dry process of the present invention is used to produce the organoclay.

EXAMPLE 22

A 60% solids dispersion of smectite was prepared adding 147 milliliters of water to 353 grams of air dried (to 15% moisture) bentonite mined in the Kaycee area of Johnson County, Wyo., while mixing on a Hobart mixer at moderate shear for 10 minutes. Then 137.9 grams of a 60% solids dispersion of Bioquat 816 was added to and mixed with the bentonite dispersion. After ten minutes of stirring, 37.6 grams of a 60% solids dispersion of Bioquat 822 was added to and mixed with the bentonite/Bioquat 816 mixture. After an additional twenty minutes of stirring, the resultant friable mixture was dried for 3 hours at 70° C. in a forced air oven, and then pulverized.

The cation exchange treatment level was 80 milliequivalents per 100 grams of clay, with the treatment ratio being 20% Bioquat 822 and 80% Bioquat 826.

EXAMPLE 23

The procedure described in Example 22 was followed except that 103.5 grams of a 60% solids dispersion of Bioquat 816 and 75.2 grams of a 60% solids dispersion of Bioquat 822 were used to treat the bentonite dispersion. The cation exchange treatment level remained at 80 milliequivalents per 100 grams of clay, with the treatment ratio changing to 40% Bioquat 822 and 60% Bioquat 816.

EXAMPLE 24

The procedure described in Example 22 was followed except that 69.0 grams of a 60% solids dispersion of Bioquat 816 and 112.8 grams of a 60% solids dispersion of Bioquat 822 were used to treat the bentonite dispersion. The cation exchange treatment level remained at 80 milliequivalents per 100 grams of clay, with the treatment ratio changing to 60% Bioquat 822 and 40% Bioquat 816.

EXAMPLE 25

The procedure described in Example 22 was followed except that 34.5 grams of a 60% solids dispersion of Bioquat 816 and 150.4 grams of a 60% solids dispersion of Bioquat 822 were used to treat the bentonite dispersion. The cation exchange treatment level remained at 80 milliequivalents per 100 grams of clay, with the treatment ratio changing to 80% Bioquat 822 and 20% Bioquat 816.

EXAMPLE 26

A 60% solids dispersion of smectite was prepared adding 147 milliliters of water to 353 grams of air dried (to 15% moisture) bentonite mined in the Kaycee area of Johnson County, Wyo., while mixing on a Hobart mixer at moderate shear for 10 minutes. Then 188 grams of a 60% solids dispersion of Bioquat 822 was added to and mixed with the bentonite dispersion. After thirty minutes of stirring, the resultant friable mixture was dried for 3 hours at 70° C. in a forced air oven, and then pulverized. The cation exchange treatment level was 80 milliequivalents per 100 grams of clay.

Figure 4:
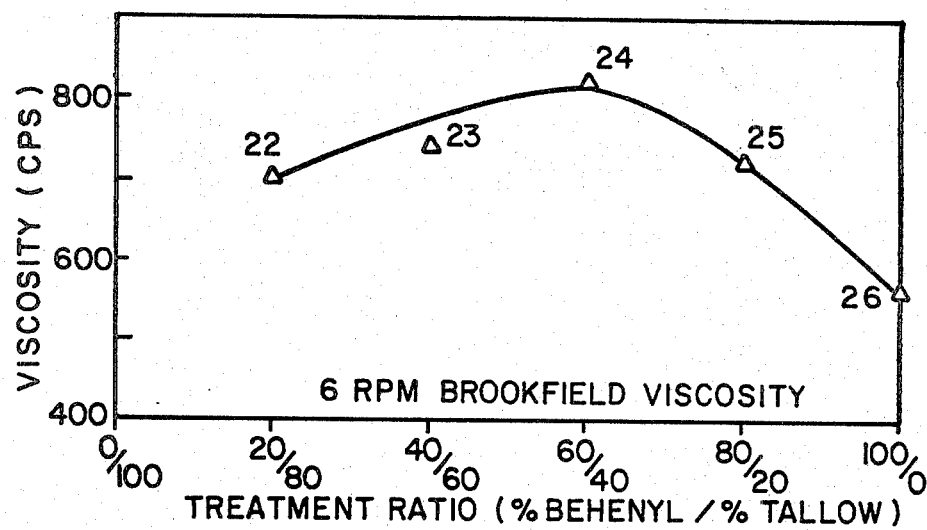
FIG. 4 is a graphical illustration of the variation in viscosity with treatment ratio for the organoclay-polyester-styrene compositions derived from the dry-processed organoclays of Examples 22 through 26.

A comparison of the viscosities of the resultant organoclay-polyester-styrene compositions produced by mixing pre-gels derived from each of the dry-processed organoclays as outlined in Examples 22 through 26 with a polyester-styrene derived from Polyester Resin 44-368 in accordance with the pre-gel preparation and addition procedures outlined hereinbefore to produce an oganoclay-polyester-styrene composition having an organoclay solids content of 1.4% is presented in FIG. 4. Each of the viscosity readings shown in FIG. 4 was taken at 6 rpm in accordance with the measurement procedure outlined hereinbefore. As illustrated in FIG. 4, the organoclays of Examples 22 through 25 prepared by the dry process of the present invention by treating the bentonite dispersion with both dimethyl benzyl hydrogenated tallow ammonium chloride and dimethyl benzyl behenyl ammonium chloride performed better as rheological modifiers than organoclays treated with either the hydrogenated tallow or the behenyl compounds alone with good viscosity enhancement occurring over a treatment ratio from 20% behenyl/80% hydrogenated tallow to 80% behenyl/20% hydrogenated tallow. The optimumal treatment ratio was 60% dimethyl benzyl behenyl ammonium chloride and 40% dimethyl benzyl hydrogenated tallow ammonium chloride.

To determine the optimumal treatment level for producing an organoclay via treatment with both dimethyl benzyl behenyl ammonium chloride and dimethyl benzyl hydrogenated tallow ammonium chloride at the optimum treatment ratio, organoclays were produced in accordance with the procedure of Example 24 at various treatment levels ranging from 50 to 90 milliequivalents per 100 grams of clay with the treatment ratio maintained at the optimum ratio of 60% Bioquat 822 and 40% Bioquat 816. A comparison of the viscosities of the resultant organoclay-polyester-styrene compositions produced by mixing the pre-gels derived from each of these organoclays with both a polyester-styrene derived from Resin 44-360 and a polyester-styrene derived from Resin 44-368 in accordance with the pre-gel preparation and addition procedures outlined hereinbefore to produce an organoclay-polyester-styrene composition having an organoclay solids content of 1.4% is presented in FIG. 5. Each of the viscosity readings was taken at 6 rpm in accordance with the measurement procedures outlined hereinbefore.

Figure 5:
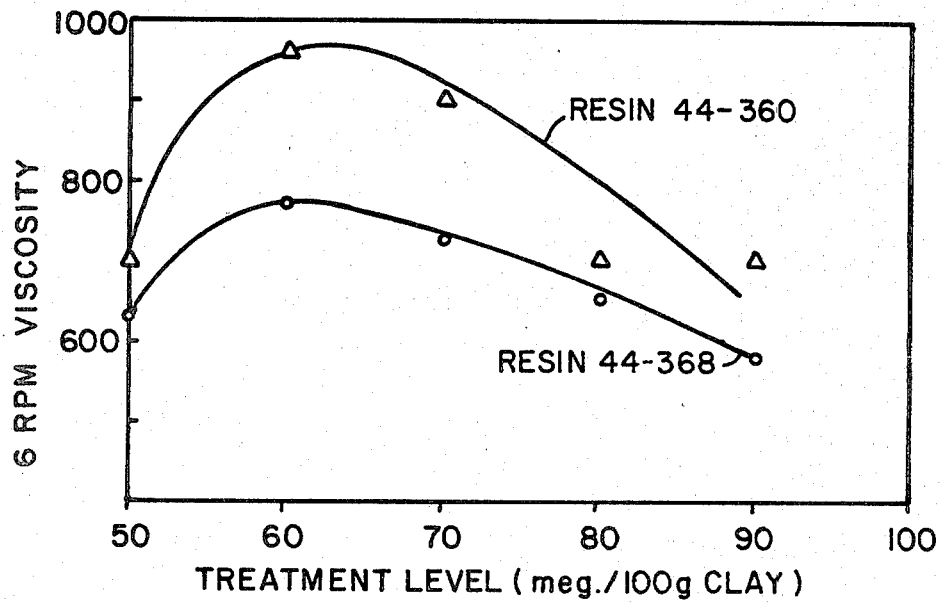
FIG. 5 is a graphical illustration of the variation in viscosity with treatment level for two organoclay-polyester-styrene compositions derived from dry-processed organoclays treated with 40% dimethyl benzyl hydrogenated tallow ammonium chloride and 60% dimethyl benzyl behenyl ammonium chloride in accordance with the two-step treatment mode of the present invention.

As shown in FIG. 5, the viscosity of the resultant organoclay-polyester-styrene compositions was most enhanced when produced with an organoclay which was derived from treatment of a bentonite dispersion with 60% Bioquat 822 and 40% Bioquat 816 at a treatment level of about 60 milliequivalents per 100 grams of clay. Although the extent of viscosity enhancement differed from one resin to the other, the optimum treatment level occurred in each case at about 60 milliequivalents per 100 grams of clay.

The satisfactory performance of the organoclays produced in accordance with the dry process of the present invention using a quaternary ammonium halide treatment agent comprising of quaternary ammonium halides having behenyl alkyl groups may also be measured by the thixotropic area index exhibited by the resultant organoclay-polyester-styrene compositions. The thixotropic area index is a well-recognized measure of the thixotropy of a gel. Thixotropy is the property of various gels of becoming fluid when shaken, stirred or otherwise distributed but of setting again when allowed to stand. Therefore, a composition having a high thixotropic area index will exhibit a relatively low viscosity when agitated but set again when allowed to stand. Ergo, such a composition can be made workable when desired by stirring.

TABLE 1

| Treatment Level (meq./100 g clay) | Thixotropic Area Index | | | |
|---|---|---|---|---|
| | Ex. 1–5 | Ex. 16–18 | Ex. 12–15 | Ex. 19–21 |
| 60 | 1.0 | — | 2.0 | — |
| 70 | 2.1 | 1.4 | 2.1 | — |
| 80 | 2.2. | 1.4 | — | 2.6 |

TABLE 1-continued

| Treatment Level (meq./100 g clay) | Thixotropic Area Index | | | |
|---|---|---|---|---|
| | Ex. 1-5 | Ex. 16-18 | Ex. 12-15 | Ex. 19-21 |
| 85 | — | — | 2.1 | — |
| 90 | 2.3 | 1.2 | — | — |
| 100 | 2.1 | — | 2.0 | 2.5 |
| 110 | — | — | — | 2.2 |

Table 1 represents the thixotropic area indicies of the organoclay-polyester-styrene compositions produced from the organoclays of Examples 12 through 21 and Examples 1 through 5 when mixed with a polyester-styrene resin derived from Polyester Resin 44-360. The thixotropic area indicies of the compositions produced from the dry process of the present invention (Examples 12-15 and 19-21) were similar to or greater than the thixotropic area indicies of the compositions produced from the prior art wet process exemplified by U.S. Pat. No. 4,240,951 (Examples 1-5) for a wide range of treatment levels.

Additionally, the effect on viscosity enhancement resulting from producing the organoclays in accordance with the dry process of the present invention using quaternary ammonium halides having behenyl alkyl groups as a significant portion of the treatment agent is evidenced by comparing the thixotropic area indicies of the compositions produced by using the organoclays of Examples 16-18 with those of Examples 12-15 and 19-21. The compositions of Examples 16-18 derived from dry processed organoclays produced using dimethyl benzyl hydrogenated tallow ammonium chloride (100% Bioquat 816) exhibited thixotropic area indicies ranging from 1.2 to 1.4. When all or at least a significant portion of the treatment agent included behenyl alkyl groups (100% Bioquat 822 for Examples 12-15; 75% Bioquat 822 for Examples 19-21), the resultant compositions exhibited improved thixotropic area indicies ranging from 2.0 to 2.6.

It is to be understood that the best mode for carrying out the present invention as recited hereinbefore is presented by the applicants to comply with the requirements of Title 35, paragraph 112 of the U.S. Code and is not intended to be regarded as in any way limiting the present invention. It will be appreciated that modifications may readily be made by those skilled in the art to the embodiments of the present invention alluded to herein. Therefore, it is intended by the appended claims to cover any such modifications which fall within the true spirit and scope of the present invention as set forth in the appended claims.

We claim:

1. A process of preparing an organoclay functional as a rheological modifier for polyester-styrene compositions comprising:
   a. forming a high solids aqueous dispersion of unfractionated smectitie in water;
   b. reacting a quaternary ammonium salt with the unfractionated smectite in said aqueous dispersion to form the product organoclay, said quaternary ammonium salt comprising from 20% to 80% of a quaternary ammonium salt having a behenyl alkyl group and from 80% to 20% of a quaternary ammonium salt having a hydrogenated tallow alkyl group; and
   c. removing the product organoclay from said aqueous dispersion.

2. A process as recited in claim 2 wherein the quaternary ammonium salt having a behenyl alkyl group comprises dimethyl benzyl behenyl ammonium chloride.

3. A process as recited in claim 2 wherein the remaining portion of the quaternary ammonium salt comprises dimethyl benzyl hydrogenated tallow ammonium chloride.

4. A process of preparing an organoclay functional as a rheological modifier for polyester-styrene compositions comprising:
   a. forming a high solids aqueous dispersion of unfractionated smectite in water;
   b. adding a first quaternary ammonium salt to the aqueous dispersion of unfractionated smectite and allowing the first quaternary ammonium salt to react with the unfractionated smectite therein; thence
   c. adding a second quaternary ammonium salt to the aqueous dispersion of unfractionated smectite and allowing the second quaternary ammonium salt to react with the unfractionated smectite therein prior to recovering the product organoclay, one of said first and said second quaternary ammonium salts having a behenyl alkyl group and the other of said first and said second quaternary ammonium salts having a hydrogenated tallow alkyl group, said first and second quaternary ammonium salts reacted with the aqueous dispersion of unfractionated smectite at a treatment ratio of from 20% to 80% of said first quaternary ammonium salt to from 80% to 20% of said second quaternary ammonium salt; and
   d. recovering the product organoclay from said aqueous dispersion.

5. A process as recited in claim 4 wherein said second quaternary ammonium salt comprises dimethyl benzyl behenyl ammnium chloride.

6. A process as recited in claim 5 wherein said first quaternary ammonium salt comprises dimethyl benzyl hydrogenated tallow ammonium chloride.

7. A process as recited in claim 6 wherein the first and second quaternary ammonium salts are reacted with the aqueous dispersion of unfractionated smectite at a treatment level of 60 milliequivalents per 100 grams of clay and at a treatment ratio of 60% dimethyl benzyl behenyl ammonium chloride and 40% dimethyl benzyl hydrogenated tallow ammonium chloride.

* * * * *